United States Patent
Onoue et al.

(10) Patent No.: US 12,378,373 B2
(45) Date of Patent: Aug. 5, 2025

(54) COMPOSITE MATERIAL AND PRODUCTION METHOD THEREFOR

(71) Applicant: Teijin Limited, Osaka (JP)

(72) Inventors: Shuhei Onoue, Osaka (JP); Takumi Kato, Osaka (JP); Takashi Toyozumi, Osaka (JP); Makoto Ootsubo, Osaka (JP); Takeru Ohki, Osaka (JP); Guofei Hua, Osaka (JP); Akihisa Nomura, Osaka (JP)

(73) Assignee: Teijin Limited, Osaka (JP)

( * ) Notice: Subject to any disclaimer, the term of this patent is extended or adjusted under 35 U.S.C. 154(b) by 1345 days.

(21) Appl. No.: 16/767,260

(22) PCT Filed: Nov. 21, 2018

(86) PCT No.: PCT/JP2018/043024
§ 371 (c)(1),
(2) Date: Dec. 16, 2020

(87) PCT Pub. No.: WO2019/107248
PCT Pub. Date: Jun. 6, 2019

(65) Prior Publication Data
US 2021/0108040 A1  Apr. 15, 2021

(30) Foreign Application Priority Data

Nov. 29, 2017 (JP) .................. 2017-229666
Aug. 8, 2018 (JP) .................. 2018-149791

(51) Int. Cl.
*C08J 5/24* (2006.01)
*B29B 15/10* (2006.01)
(Continued)

(52) U.S. Cl.
CPC .............. *C08J 5/042* (2013.01); *B29B 15/10* (2013.01); *B29C 70/16* (2013.01); *B29C 70/46* (2013.01);
(Continued)

(58) Field of Classification Search
CPC ........ C08J 5/042; C08J 5/243; C08J 2377/02; B29C 70/16; B29K 2105/12; B29K 2077/00; B29K 2101/12
See application file for complete search history.

(56) References Cited

U.S. PATENT DOCUMENTS

2009/0233092 A1  9/2009  Hara et al.
2010/0178495 A1  7/2010  Taketa et al.
(Continued)

FOREIGN PATENT DOCUMENTS

CN  103154336 A  6/2013
CN  104781316 A  7/2015
(Continued)

OTHER PUBLICATIONS

Article 94(3) Communication for EP18883729.8, dated Dec. 17, 2020.
(Continued)

*Primary Examiner* — Alexander C Kollias
(74) *Attorney, Agent, or Firm* — MaxGoLaw PLLC

(57) ABSTRACT

A composite material includes a thermoplastic matrix resin and carbon fibers A including carbon fiber bundles A1 in which $Li/(Ni \times Di^2)$ is $6.7 \times 10^1$ to $3.3 \times 10^3$, and a thermoplastic matrix resin. The carbon fibers A have a fiber length of 5-100 mm and the carbon fiber bundles A1 are contained in an amount of 80 vol % or larger but less than 100 vol % with respect to the carbon fibers A and wherein removal of the matrix resin from the composite material gives a carbon fiber mass which, when compressed to a thickness of Tf, has (Continued)

a repulsive force P of 0.05-1.00 MPa A method for producing the composite material including subjecting a composite composition to an impregnation treatment with a compression/impregnation device.

14 Claims, 1 Drawing Sheet

(51) Int. Cl.
  *B29C 70/16* (2006.01)
  *B29C 70/46* (2006.01)
  *B29C 70/50* (2006.01)
  *C08J 5/04* (2006.01)
  *B29K 77/00* (2006.01)
  *B29K 101/12* (2006.01)
  *B29K 105/12* (2006.01)
  *B29K 307/04* (2006.01)

(52) U.S. Cl.
  CPC .............. *B29C 70/50* (2013.01); *C08J 5/243* (2021.05); *B29K 2077/00* (2013.01); *B29K 2101/12* (2013.01); *B29K 2105/12* (2013.01); *B29K 2307/04* (2013.01); *C08J 2377/02* (2013.01)

(56) References Cited

U.S. PATENT DOCUMENTS

| | | |
|---|---|---|
| 2010/0304145 A1 | 12/2010 | Yonemoto et al. |
| 2013/0274413 A1 | 10/2013 | Ozeki et al. |
| 2013/0295811 A1 | 11/2013 | Shinmen et al. |
| 2013/0317161 A1 | 11/2013 | Konagai et al. |
| 2014/0004308 A1 | 1/2014 | Taniguchi et al. |
| 2014/0039114 A1 | 2/2014 | Hagihara et al. |
| 2014/0080960 A1 | 3/2014 | Konagai et al. |
| 2014/0080961 A1 | 3/2014 | Konagai et al. |
| 2014/0186584 A1 | 7/2014 | Arakawa et al. |
| 2014/0356612 A1 | 12/2014 | Sano et al. |
| 2014/0370245 A1 | 12/2014 | Nagakura et al. |
| 2015/0005434 A1* | 1/2015 | Miyoshi .................. C08K 7/06 524/495 |
| 2015/0031257 A1 | 1/2015 | Ootsubo et al. |
| 2015/0044455 A1 | 2/2015 | Konagai et al. |
| 2015/0044470 A1 | 2/2015 | Tomioka et al. |
| 2015/0152231 A1 | 6/2015 | Ohki et al. |
| 2015/0158984 A1 | 6/2015 | Sonoda et al. |
| 2015/0202807 A1 | 7/2015 | Sano et al. |
| 2015/0203642 A1 | 7/2015 | Sonoda et al. |
| 2015/0203663 A1 | 7/2015 | Sonoda et al. |
| 2015/0239182 A1 | 8/2015 | Kosaka et al. |
| 2015/0292145 A1 | 10/2015 | Sonoda et al. |
| 2016/0101542 A1 | 4/2016 | Kosaka et al. |
| 2016/0185922 A1 | 6/2016 | Miura et al. |
| 2016/0194461 A1 | 7/2016 | Suzuki et al. |
| 2016/0194468 A1 | 7/2016 | Ogasawara et al. |
| 2016/0319088 A1 | 11/2016 | Saji |
| 2016/0339669 A1 | 11/2016 | Miyoshi et al. |
| 2017/0008260 A1 | 1/2017 | Fujii et al. |
| 2017/0106606 A1 | 4/2017 | Toyozumi et al. |
| 2017/0183465 A1 | 6/2017 | Kawabe et al. |
| 2018/0001577 A1 | 1/2018 | Onoue et al. |
| 2018/0134857 A1 | 5/2018 | Sonoda et al. |
| 2018/0155855 A1 | 6/2018 | Shinmen et al. |
| 2018/0244875 A1 | 8/2018 | Konagi et al. |
| 2019/0061201 A1 | 2/2019 | Kosaka et al. |
| 2019/0153628 A1 | 5/2019 | Shinmen et al. |
| 2020/0263327 A1 | 8/2020 | Shinmen et al. |
| 2020/0369843 A1 | 11/2020 | Dotsubo et al. |

FOREIGN PATENT DOCUMENTS

| | | |
|---|---|---|
| JP | 2004-142165 A | 5/2004 |
| JP | 2013-049749 A | 3/2013 |
| JP | 2013049150 A | 3/2013 |
| JP | 2013-072042 A | 4/2013 |
| JP | 2013202890 A | 10/2013 |
| JP | 2015140353 A | 8/2015 |
| JP | 2016-027956 A | 2/2016 |
| JP | 2017165082 A | 9/2017 |
| WO | 2007126133 A1 | 11/2007 |
| WO | 2008149615 A1 | 12/2008 |
| WO | 2013115337 A1 | 8/2013 |
| WO | 2014017612 A1 | 1/2014 |
| WO | 2014021315 A1 | 2/2014 |
| WO | 2014021316 A1 | 2/2014 |
| WO | 2015111536 A1 | 7/2015 |
| WO | 2015115225 A1 | 8/2015 |
| WO | 2015163408 A1 | 10/2015 |
| WO | 2016152563 A1 | 9/2016 |
| WO | 2017159264 A | 1/2019 |

OTHER PUBLICATIONS

Office Action issued in corresponding Chinese Patent Appln. No. 201880077623.5, dated Sep. 28, 2021.
Int'l. Search Report for PCT/JP2018/0043024, dated Jan. 22, 2019.
Int'l. Search Report for PCT/JP2018/0043022, dated Jan. 22, 2019.
Lee T. Harper, et al., A Random Fibre Network Model for Predicting the Stochastic Effects of Discontinuous Fibre Composites, 2007 16th Int'l Conf. on Composite Materials, pp. 1-10.
Supplementary Search Report for EP18882318.1, dated Nov. 30, 2020.
Supplementary Search Report for EP18883729.8, dated Dec. 4, 2020.
M. Szpieg et al: "Reuse of polymer materials and carbon fibres in novel engineering composite materials", Plastics, Rubber and Composites, vol. 38, Jan. 1, 2009 (Jan. 1, 2009), pp. 419-425.
Article 94(3) Communication for EP18882318.1, dated Dec. 11, 2020.
Office Action issued in corresponding Chinese Patent Appln. No. 201880077597.6, dated Sep. 17, 2021.
Notice of Submission of Publication, issued in corresponding Japanese Patent Appln. No. 2021-120408, dated May 24, 2022.
Submission of Publications, issued in corresponding Japanese Patent Appln. No. 2021-120408, dated May 20, 2022.
Int'l. Search Report for PCT/JP2018/0043023, dated Jan. 22, 2019.
Office Action issued in corresponding Japanese Patent Appln. No. 2019-557184, dated Feb. 2, 2021.
Office Action issued in corresponding Japanese Patent Appln. No. 2019-557815, dated Feb. 2, 2021.

* cited by examiner

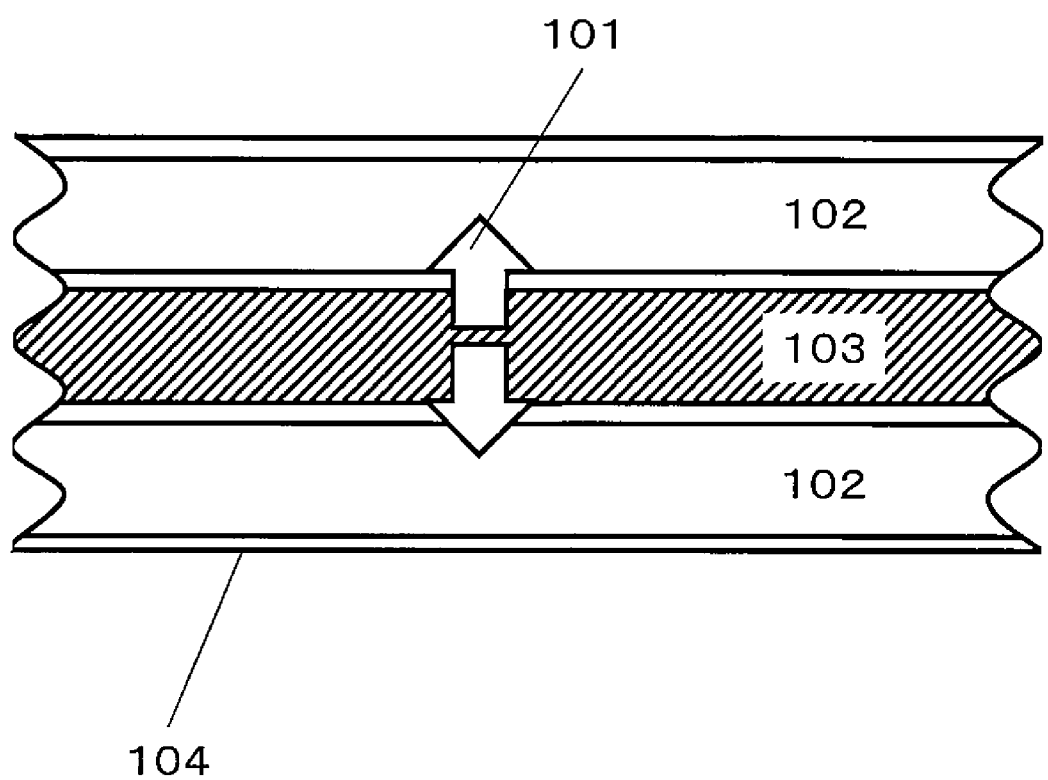

COMPOSITE MATERIAL AND PRODUCTION METHOD THEREFOR

TECHNICAL FIELD

The present invention relates to a composite material including carbon fibers and a thermoplastic matrix resin, and a method for producing the composite material, which uses a reaction force (pressure for compressing to specific thickness) of a carbon fiber aggregate in order to impregnate the carbon fibers with the thermoplastic resin.

BACKGROUND ART

A carbon fiber reinforced thermoplastic resin molded body has excellent mechanical properties and has attracted attention as a structural member of automobiles or the like in recent years.

Patent Literature 1 describes a composite material produced by supplying a thermoplastic matrix resin to glass fiber bundles each containing 2000 or more single fibers as reinforcing fibers, cutting an impregnated fiber bundle impregnated in advance to a predetermined length, and heat-melting and cooling the fiber bundle.

Patent Literature 2 describes a quasi-isotropic reinforced sheet material that is substantially formed by integrating a plurality of chopped semi-prepreg sheet materials in an unimpregnated state.

Patent Literature 3 describes a composite material in which large tow carbon fibers are cut after being opened and divided, which expresses higher mechanical characteristic and lower variation in the mechanical characteristic.

CITATION LIST

Patent Literature

Patent Literature 1: JP-A-2004-142165
Patent Literature 2: JP-A-2016-027956
Patent Literature 3: WO 2017/159264

SUMMARY OF INVENTION

Technical Problem

However, the composite material described in Patent Literature 1 cuts the impregnated fiber bundles where the reinforcing fiber bundles are impregnated with the thermoplastic resin in advance to a predetermined length, and the cut fiber bundles are heated and melted again, and cooled and re-impregnated. A pre-impregnation step needs to be prepared in advance, and is not preferable in view of productivity and energy saving. Further, the fiber form described in Patent Literature 1 consists only of the reinforcing fiber bundles as the reinforcing fibers. Since the reaction force of the reinforcing fiber aggregate (a pressure for compressing to a specific thickness, that is, a reaction force when the carbon fiber aggregate in the present invention is compressed to a thickness Tf) is too small, time for impregnation in a subsequent step becomes long when there is no preliminary impregnation.

In a case of using the quasi-isotropic reinforced sheet described in Patent Literature 2, since the number of bundled single fibers constituting the carbon fiber bundle is too large, the reaction force of the reinforcing fiber aggregate is too small. In order to impregnate the quasi-isotropic reinforced sheet described in Patent Literature 2 with the thermoplastic resin at high speed, the thickness of the quasi-isotropic reinforced sheet is designed to be thin. Since the production of the molded body requires to laminate several layers of the quasi-isotropic reinforced sheet, it cannot be said that productivity is good.

The material described in Patent Literature 3 contains the fiber bundles only as in Patent Literature 1 and is not suitable for impregnation with the thermoplastic resin at high speed since the reaction force of the carbon fiber aggregate is too small. Further, the material described in Patent Literature 3 contains an untreated section which is not divided during division of the carbon fiber bundles, and contains a large fiber bundle called as a bonded bundle aggregate due to the untreated section which is not divided. Therefore, the bonded bundle aggregate causes not only a defect by itself but also non-uniformity of the reaction force of the carbon fiber aggregate due to non-uniformity of sizes of the carbon fiber bundles when the carbon fiber bundles are impregnated with the thermoplastic resin. Therefore, although a part where the reaction force of the carbon fiber aggregate is appropriate is impregnated, it is difficult to impregnate a part where the reaction force is small. Further, when a part where the reaction force is too large is mixed, the carbon fiber aggregate cannot be uniformly pressurized when pressurized in an impregnation step, the carbon fibers and the thermoplastic resin move unintentionally in an in-plane direction inside the composite material, and non-uniformity occurs in the carbon fiber volume fraction and the carbon fiber orientation of the composite material. For example, isotropic disturbance occurs even when tried to produce an isotropic composite material.

When the reaction force of the carbon fiber aggregate in the present invention is too small, impregnation at high speed with the thermoplastic resin cannot be performed, the obtained composite material has a lot of unimpregnated fiber bundles, and as a result, strength decreases, and strength non-uniformity also occurs.

Therefore, an object of the present invention is to provide a composite material that has few unimpregnated carbon fiber bundles and can achieve both high strength and reduction in strength non-uniformity and a method for producing the composite material that can impregnate carbon fibers with a thermoplastic resin at high speed.

Solution to Problem

In order to solve the above problems, the present invention provides the following solutions.

1. A composite material containing: carbon fibers A including carbon fiber bundles A1 in which $Li/(Ni \times Di^2)$ is $6.7 \times 10^1$ or more and $3.3 \times 10^3$ or less; and a thermoplastic matrix resin, wherein
   the carbon fibers A have fiber lengths of 5 mm or more and 100 mm or less,
   the carbon fibers A contains 80 vol % or more and less than 100 vol % of the carbon fiber A1,
   an aggregate of the carbon fibers taken out from the composite material from which the matrix resin is removed has a reaction force P of 0.05 MPa or more and 1.00 MPa or less when the aggregate is compressed to a thickness Tf.
Wherein,
   Li: fiber length of carbon fiber bundle (mm)
   Di: diameter of single carbon fibers constituting carbon fiber bundle (mm)
   Ni: number of single fibers contained in carbon fiber bundle Tf: (areal weight of carbon fiber aggregate÷carbon fiber density)×3 (mm)

2. The composite material according to the above 1, wherein the reaction force P has a coefficient of variation of 20% or less.

3. The composite material according to the above 1 or 2, wherein the carbon fiber A further includes more than 0 vol % and less than 20 vol % of carbon fibers A2 in which $Li/(Ni×Di^2)$ is more than $3.3×10^3$.

4. The composite material according to any one of the above 1 to 3, further including 5 vol % or less of carbon fibers A3 in which $Li/(Ni×Di^2)$ is less than $6.7×10^1$.

5. The composite material according to any one of the above 1 to 4, wherein $L_{A1}/(N_{A1}×D_{A1}^2)$ is $1.0×10^2$ or more and $3.3×10^3$ or less. Wherein, $L_{A1}$: weight average fiber length (mm) of carbon fiber bundle A1

$N_{A1}$: average number of single fibers in carbon fiber bundles A1

$D_{A1}$: diameter (mm) of single carbon fibers constituting carbon fiber bundle A1

6. The composite material according to any one of the above 1 to 5, wherein the aggregate of the carbon fibers taken out from the composite material has a areal weight of 100 g/m² or more and less than 3000 g/m².

7. The composite material according to any one of the above 1 to 6, wherein the carbon fiber bundles A1 have an average width $W_{A1}$ of 0.1 mm or more and 2.0 mm or less, and an average thickness $T_{A1}$ of 20 μm or more and 95 μm or less.

8. A method for producing a composite material, including performing impregnation of a composite composition containing carbon fibers A having fiber lengths of 5 mm or more and 100 mm or less and a thermoplastic resin by using a compression impregnation device, wherein the carbon fibers A contain 80 vol % or more and less than 100 vol % of carbon fiber bundles A1 in which $Li/(Ni×Di^2)$ is $6.7×10^1$ or more and $3.3×10^3$ or less, and an aggregate of the carbon fibers taken out from the composite material from which the matrix resin is removed has a reaction force P of 0.05 MPa or more and 1.00 MPa or less when the aggregate is compressed to a thickness Tf.

Wherein,

Li: fiber length of carbon fiber bundle (mm)

Di: diameter of single carbon fibers constituting carbon fiber bundle (mm)

Ni: number of single fibers contained in carbon fiber bundle

Tf: (areal weight of carbon fiber aggregate÷carbon fiber density)×3 (mm)

9. The method for producing a composite material according to the above 8, wherein he compression impregnation device has a narrowest clearance of 0.9×Tm or more and 1.5×Tm or less, wherein Tm represents a theoretical thickness of the composite material.

Advantageous Effects of Invention

According to the present invention, a composite material that has few unimpregnated carbon fiber bundles and can achieve both high strength and reduction in strength non-uniformity and a method for producing the composite material that can impregnate carbon fibers with a thermoplastic resin at high speed can be provided. In particular, use of the carbon fiber aggregate designed as in the present invention makes it possible to impregnate the carbon fiber with the thermoplastic resin at high speed by utilizing the reaction force of the carbon fiber aggregate itself, and productivity is also excellent.

BRIEF DESCRIPTION OF DRAWINGS

FIG. 1 is a schematic diagram showing forces of a carbon fiber aggregate entering into thermoplastic resins.

DESCRIPTION OF EMBODIMENTS

[Carbon Fiber]

A polyacrylonitrile (PAN)-based carbon fiber, a petroleum/coal pitch-based carbon fiber, a rayon-based carbon fiber, a cellulose-based carbon fiber, a lignin-based carbon fiber, a phenol-based carbon fiber, and the like are known as carbon fibers used in the present invention, and any of these carbon fibers can be suitably used in the present invention. In particular, the polyacrylonitrile (PAN)-based carbon fiber is preferably used in view of excellent tensile strength in the present invention.

The carbon fiber used in the present invention may have a sizing agent adhered to a surface thereof. When the carbon fiber to which the sizing agent adheres is used, a type of the sizing agent can be appropriately selected depending on types of the carbon fiber and a matrix resin, and is not particularly limited.

[Fixing Agent of Carbon Fiber Bundle Form]

In order to improve rigidity of the carbon fiber bundle and adjust the reaction force P of the carbon fiber aggregate to an appropriate range, the carbon fiber bundle may be fixed using a fixing agent of carbon fiber bundle form (hereinafter, sometimes simply referred to as a fixing agent).

A step of applying the fixing agent is not particularly limited as long as it is in a production process, but is preferably applied after the carbon fiber bundle is preferably widened.

The type of the fixing agent used in the present invention is not particularly limited as long as the carbon fiber bundle can be fixed, but is preferably a solid at normal temperature, more preferably a resin, and still more preferably a thermoplastic resin. The fixing agent may be only one type or two or more types.

When the thermoplastic resin is used as the fixing agent, one having a desired softening point can be appropriately selected and used depending on an environment in which the fixed carbon fiber bundle is produced. A range of the softening point is not limited, but a lower limit value of the softening point is preferably 60° C. or higher, more preferably 70° C. or higher, and still more preferably 80° C. or higher. Since the softening point of the fixing agent is set to 60° C. or higher, the fixing agent is preferable since it is solid at room temperature and excellent in operability even in a use environment at high temperature in summer. On the other hand, the upper limit is 250° C. or lower, more preferably 180° C. or lower, still more preferably 150° C. or lower, and even more preferably 125° C. or lower. Since the softening point of the fixing agent is 250° C. or lower, the fixing agent can be sufficiently heated by a simple heating device, the fixing agent is easy to be cooled and solidified, and thus a time until the carbon fiber bundle is fixed is preferably shortened. When the thermoplastic resin is used as the fixing agent, a thermoplastic matrix and an easily fit thing contained in the composite material are preferable.

[Fiber Diameter of Carbon Fiber]

A fiber diameter of a single carbon fiber (in general, single yarn may be called filament) used in the present invention may be appropriately determined depending on the type of the carbon fiber, but is not particularly limited. The average fiber diameter is preferably in the range of 3 μm to 50 μm, more preferably in the range of 4 μm to 12 μm, and still more preferably in the range of 5 μm to 8 μm. When the carbon fiber has a fiber bundle shape, the fiber diameter of the carbon fiber does not refer to a diameter of the fiber bundle, but refers to the diameter of the (single) carbon fiber constituting the fiber bundle. The average fiber diameter of the carbon fibers can be measured, for example, by a method described in JIS R-7607: 2000.

[Carbon fiber A]

The carbon fiber used in the present invention contains the carbon fiber A having a fiber length of 5 mm or more and 100 mm or less. A volume fraction of the carbon fiber A contained in the composite material of the present invention is preferably 50 vol % to 100 vol %, and more preferably 70 vol % to 100 vol % with respect to the entire carbon fibers contained in the composite material of the present invention.

The carbon fiber A of the present invention includes carbon fiber bundles A1 in which $Li/(Ni \times Di^2)$ satisfies $6.7 \times 10^1$ or more and $3.3 \times 10^3$ or less.

[Fiber Length of Carbon Fiber A]

The carbon fiber A used in the present invention has a fiber length of 5 mm or more and 100 mm or less. In other words, the carbon fiber A may be defined as the carbon fiber contained in the composite material and having a fiber length of 5 mm or more and 100 mm or less.

1. Weight Average Fiber Length of Carbon Fibers A

A weight average fiber length of the carbon fibers A used in the present invention is not particularly limited, but is preferably 5 mm or more and 100 mm or less. The weight average fiber length of the carbon fibers A is more preferably 5 mm or more and 80 mm or less, and still more preferably 5 mm or more and 60 mm or less. When the weight average fiber length of the carbon fibers A is 100 mm or less, fluidity of the composite material during press molding is improved, and it is easy to obtain a desired shape of the molded body. On the other hand, when the weight average fiber length is 5 mm or more, mechanical strength of the composite material is easy to be improved. The present invention may use a combination of carbon fibers A having different fiber lengths with each other in combination. The carbon fibers used in the present invention may have a single peak or a plurality of peaks in fiber length distribution.

[Aspect Ratio of Carbon Fiber Bundles A1]

In the present invention, carbon fiber bundles in which $Li/(Ni \times Di^2)$ is $6.7 \times 10^1$ or more and $3.3 \times 10^3$ or less is defined as the carbon fiber bundles A1. $Li/(Ni \times Di^2)$ represents an aspect ratio of the carbon fiber bundle.

A normal aspect ratio indicates a ratio of a length to a diameter when focusing on one fiber. However, an aspect ratio of the present invention considers the cross-sectional area (considering both the thickness and the width) of the fiber bundle by squaring the fiber diameter. The larger the value of $Li/(Ni \times DP)$ is, the more elongated the carbon fiber bundle is, and conversely, the smaller the value of $Li/(Ni \times Di^2)$ is, the thicker and shorter the carbon fiber bundle is. Li represents the length of each carbon fiber bundle, and Ni represents the number of single fibers contained in each carbon fiber bundle. In a case where the fiber length of the carbon fiber bundles A1 is a fixed length, when the number of fibers contained in the carbon fiber bundle A1 is maximum, the aspect ratio of the carbon fiber bundles A1 is minimum In general, the larger the aspect ratio is, the higher the strength of the composite material is, and when the composite material contains the carbon fiber bundles A1 in which $Li/(Ni \times Di^2)$ is $6.7 \times 10^1$ or more, the composite material exhibits high strength. However, in a case where the aspect ratio is too large, the fluidity during press molding may decrease, and when the composite material contains the carbon fiber bundles A1 in which $Li/(Ni \times Di^2)$ is $3.3 \times 10^3$ or less, the decrease in fluidity can be prevented.

It is preferable that $L_{A1}/(N_{A1} \times D_{A1}^2)$ of the carbon fiber bundles A1 of the present invention is $1.0 \times 10^2$ or more and $3.3 \times 10^3$ or less.

Wherein, $L_{A1}$: weight average fiber length (mm) of carbon fiber bundles A1

$N_{A1}$: average number of single fibers contained in each carbon fiber bundle A1

$D_{A1}$: diameter (mm) of single carbon fibers constituting carbon fiber bundles A1

The aspect ratio of the carbon fiber bundles A1 also affects the reaction force P of the carbon fiber aggregate in addition to the strength of the composite material and the fluidity during press molding. When the value of $L_{A1}/(N_{A1} \times D_{A1}^2)$ of the carbon fiber bundles A1 is more than $3.3 \times 10^3$, since the number of carbon fiber bundles is relatively large compared with the same carbon fiber volume fraction, the carbon fiber aggregate is in a dense state and the reaction force P of the carbon fiber aggregate becomes too large. The reaction force P will be described later. On the contrary, when the value of $L_{A1}/(N_{A1} \times D_{A1}^2)$ is less than $1.0 \times 10^2$, the number of carbon fiber bundles is relatively small, so that the carbon fiber aggregate is in a sparse state, and the reaction force P becomes too small.

An upper limit of $L_{A1}/(N_{A1} \times D_{A1}^2)$ is desirably $2.0 \times 10^3$ or less, preferably $1.2 \times 10^3$ or less, more preferably $9.0 \times 10^2$ or less, and still more preferably $8.5 \times 10^2$. A lower limit of $L_{A1}/(N_{A1} \times D_{A1}^2)$ is desirably $1.3 \times 10^2$ or more, preferably $1.6 \times 10^2$ or more, more preferably $3.2 \times 10^2$ or more, and still more preferably $4.0 \times 10^2$ or more.

[Proportion of Carbon Fiber Bundles A1]

In the present invention, the carbon fibers A contains 80 vol % or more, preferably 90 vol % or more, and more preferably 95 vol % or more of the carbon fiber bundles A1. In other words, the carbon fiber A other than the carbon fiber bundles A1 of the present invention is less than 20 vol %, preferably less than 10 vol %, and more preferably less than 5 vol %. If the proportion of the carbon fiber bundle A1 contained in the carbon fiber A increases, a proportion of carbon fibers A2 or carbon fibers A3 to be described later decreases.

When the proportion of the carbon fiber bundles A1 is less than 80 vol % with respect to the carbon fibers A, the reaction force P of the carbon fiber aggregate is too large. The reaction force P will be described later. When the proportion of the carbon fiber bundles A1 is 100 vol % with respect to the carbon fibers A, the reaction force P of the carbon fiber aggregate is too small.

The carbon fibers A in which the value of $Li/(Ni \times Di^2)$ is less than $6.7 \times 10^1$ or more than $3.3 \times 10^3$ is the carbon fiber A which is not the carbon fiber bundle A1 in the present invention.

[Carbon Fiber A2]

The carbon fiber A in the present invention may contain more than 0 vol % and less than 20 vol % of carbon fibers A2 in which $Li/(Ni \times Di^2)$ is more than $3.3 \times 10^3$. Since $Li/(Ni \times Di^2)$ is more than $3.3 \times 10^3$, the carbon fibers A2 have a large aspect ratio, and is preferably contained in small quantities in order to increase the reaction force P of the carbon fiber aggregate. When the carbon fiber aggregate contains carbon fibers A2, denseness of the carbon fiber aggregate is increased, and as a result, the reaction force P of the carbon fiber aggregate can be increased, and impregnation of the carbon fiber with the thermoplastic matrix resin can be promoted.

However, when a content of the carbon fibers A2 is too large, the denseness of the carbon fiber aggregate becomes too high, the reaction force P becomes too large, impregnation with the thermoplastic resin is hard, and the strength of the composite material or the molded body may also decrease.

A weight average fiber length of the carbon fibers A2, a diameter and an average number of single fibers in the carbon fibers A2 can be defined as follows. When the carbon fibers A2 are completely monofilament, $N_{A2}$ave is one.

$L_{A2}$: weight average fiber length (mm) of carbon fibers A2
$D_{A2}$: diameter (mm) of single carbon fibers constituting carbon fibers A2
$N_{A2}$ave: average number of fibers contained in each carbon fiber A2

[Carbon Fiber A3]

Although the carbon fibers A other than the carbon fiber bundles A1 are preferably the carbon fibers A2, the carbon fibers A preferably contains 5 vol % or less of carbon fibers A3 in which $Li/(Ni \times Di^2)$ is less than $6.7 \times 10^1$. Although there are few problems even the carbon fibers A3 may be mixed in 5 vol % or less, the content of the carbon fibers A3 is more preferably 3 vol % or less, and even more preferably 1 vol % or less with respect to the carbon fibers A. Most preferably, the composite material or the molded body does not contain the carbon fiber A3 in which $Li/(Ni \times Di^2)$ is less than $6.7 \times 10^1$.

Since the carbon fibers A3 have a small aspect ratio, the presence of the carbon fibers A3 has an effect of reducing the number of carbon fiber bundles relatively in the carbon fiber aggregate. The reaction force P of the carbon fiber aggregate may become too small when the content of the carbon fibers A3 is more than 5 vol % with respect to the carbon fiber A.

In particular, as described in Patent Literature 3, when there is a bonded bundle aggregate in which all the carbon fiber bundles are not divided at all, the resin pockets increase around the bonded bundle aggregate which may be starting points of destruction of the composite material. The outer appearance of the composite material is extremely deteriorated when the non-impregnated portion stands out on the surface of the composite material. When a thermosetting matrix is used, impregnation is easy, but when a thermoplastic matrix resin is used, the problem becomes significant.

Further, in the invention described in Patent Literature 3, during division of the carbon fiber bundles, an undivided section is present, and a large fiber bundle called a bonded bundle aggregate is included due to the undivided section. Therefore, the bonded bundle aggregate causes not only a defect by itself, but also causes places where the reaction force of the carbon fiber aggregate may be too small or too large when the carbon fiber bundles are impregnated with the thermoplastic resin. Therefore, in the impregnation step, the carbon fibers and the thermoplastic resin excessively move in an in-plane direction in the composite material to cause non-uniformity in the carbon fiber volume fraction and the fiber orientation of the composite material.

[Average Width $W_{a1}$ of Carbon Fiber Bundles A1]

In the present invention, the carbon fiber bundles A1 preferably have an average width $W_{A1}$ of 0.1 mm or more and 2.0 mm or less. An upper limit of the average width $W_{A1}$ is more preferably less than 1.5 mm, still more preferably less than 1.1 mm, and even more preferably less than 1.0 mm As long as the thicknesses of the carbon fiber bundles A1 are constant, the "reaction force P" in the present invention increases as the average width $W_{A1}$ decreases. This is because the carbon fiber aggregate is dense if the carbon fiber bundles are thin.

When the average width $W_{A1}$ is 2.0 mm or less, the aspect ratio of the carbon fiber bundles increase, and high strength of the carbon fiber bundles can be sufficiently exhibited in the composite material.

On the other hand, a lower limit of the average width $W_{A1}$ is more preferably 0.3 mm or more. As long as the average width $W_{A1}$ is 0.3 mm or more, an appropriate reaction force can be obtained without excessively densifying the carbon fiber aggregate.

[Average Thickness $T_{a1}$ of Carbon Fiber Bundles A1]

In the present invention, an average thickness $T_{A1}$ of the carbon fiber bundles A1 is desirably 95 μm or less, preferably less than 85 μm, more preferably less than 75 μm, still more preferably less than 70 μm, particularly preferably less than 65 μm, and most preferably less than 60 μm. When the average thickness $T_{A1}$ of the carbon fiber bundles A1 is 95 μm or less, the time required for resin impregnation of the carbon fiber bundle shortens, so that impregnation proceeds efficiently.

Furthermore, when the number of carbon fiber bundles contained in the composite material increases as compared with that having the same carbon fiber volume fraction (Vf), the carbon fiber bundles form a denser structure in the composite material, and the strength of the composite material is also increased.

A lower limit of the average thickness $T_{A1}$ of the carbon fiber bundle A1 is preferably 20 μm or more. As long as the average thickness $T_{A1}$ of the carbon fiber bundle A1 is 20 μm or more, the rigidity of the carbon fiber bundle A1 can be sufficiently ensured, and the "reaction force P" in the present invention can be increased. The lower limit of the average thickness $T_{A1}$ of the carbon fiber bundle A1 is more preferably 30 μm or more, and still more preferably 40 μm or more.

[Carbon Fiber B]

The composite material of the present invention may contain carbon fibers B having fiber lengths of less than 5 mm, and the carbon fibers B preferably satisfy $N_B < N_{A1}$.

$N_B$: average number (number) of fibers constituting each carbon fiber B

In the present invention, carbon fibers having a fiber length of less than 5 mm are all carbon fibers B, and carbon fibers having a fiber length of 5 mm or more are not carbon fibers B. The carbon fibers B may be carbon fiber bundles or a single fiber (monofilament).

[Weight Average Fiber Length of Carbon Fibers B]

A weight average fiber length $L_B$ of the carbon fibers B is not particularly limited, but a lower limit thereof is preferably 0.05 mm or more, more preferably 0.1 mm or more, and still more preferably 0.2 mm or more. When the weight average fiber length $L_B$ of the carbon fibers B is 0.05 mm or more, the mechanical strength of the composite material or the molded body using the composite material is easy to be ensured.

The upper limit of the weight average fiber length $L_B$ of the carbon fibers B is preferably less than a thickness of the molded body after molding the composite material. Specifically, the upper limit of the average bundle width $W_{A1}$ is more preferably less than 5 mm, still more preferably less than 3 mm, and even more preferably less than 2 mm

[Reaction Force P of Carbon Fiber Aggregate]

1. Thickness Tf

In the present invention, the reaction force P of a carbon fiber aggregate is 0.05 MPa or more and 1.00 MPa or less when the aggregate is taken out from the composite material by removing the matrix resin (including organic substances other than the matrix resin) contained in the composite material and compressed to a thickness Tf.

Here, Tf is a thickness of (areal weight of carbon fiber aggregate÷carbon fiber density)×3 (mm). For example, when "Tenax" (registered trademark) UTS50-24K (density: 1.79 (g/cm$^3$)) is used as the carbon fiber, and when the areal weight of the carbon fibers taken out by removing the matrix resin of the composite material is 1790 (g/m$^2$), Tf=1790 (g/m$^2$)÷1.79 (g/cm$^3$)×3=3.0 (mm)=3000 (μm).

The areal weight of the carbon fiber aggregate when Tf is calculated is not dependent on a method of taking out the carbon fiber aggregate from the composite material. For example, assuming that the mass of the carbon fiber aggregate taken out from the composite material having a size of 1 m×1 m is set to $T_1$ g. Here, even if the carbon fiber aggregate extends when taken out from the composite material and has a size of 1.1 m×1.1 m, since the carbon fiber aggregate of originally $T_1$ g is contained in the composite material having a size of 1 m×1 m, the areal weight of the carbon fiber aggregate for calculating Tf is $T_1$ (g/m$^2$).

2. Reaction Force P

The reaction force P means magnitude of a force of the carbon fiber aggregate spreading in the thickness direction. For example, FIG. 1 shows forces (101 in FIG. 1) of the carbon fiber aggregate pressing the thermoplastic resins when the carbon fiber is impregnated with the thermoplastic resin. As long as the reaction force P of the carbon fiber aggregate is in the above range, the carbon fiber aggregate is easy to penetrate into the softened thermoplastic resins in the thickness direction (the upper and lower in FIG. 1) of the composite composition in a closed space where an impregnation of the composite composition is performed.

As long as the reaction force P is 1.00 MPa or less, excessive flow of the thermoplastic resin in the in-plane direction can be reduced when the carbon fiber penetrates into the thermoplastic resin in the closed space where the composite composition is accommodated.

A method of controlling the reaction force P is not particularly limited, but the reaction force P can be controlled by sizes (width, thickness) of carbon fiber bundles, volume fractions of A1, A2, and A3 in the carbon fiber A, a fiber orientation in the thickness direction, an adhesion amount of the fixing agent, and the like. An example thereof will be shown in Examples to be described below.

The reaction force P is preferably 0.50 MPa or less.

3. Taking Out of Carbon Fiber Aggregate

In order to measure the reaction force P in the present invention, it is necessary to take out the carbon fiber aggregate from the composite material, but a method for taking out is not particularly limited. Preferably, the composite material may be treated for about one hour at a temperature at which the matrix component burns down, and when the thermoplastic matrix resin uses, for example, a nylon resin, the composite material may be treated at 500° C. for one hour.

When the thermoplastic matrix resin component is unknown, thermal gravimetric analysis may be performed in advance to investigate the temperature at which the matrix resin burns down, and the temperature and time are preferably set. When the matrix resin is removed, there is no problem even if other organic components are removed (burn down) together.

4. Taking Out of Carbon Fiber Aggregate from Molded Body

In addition, since the composite material is generally molded into a molded body, the carbon fiber aggregate may be taken out from the molded body. However, since the form of the carbon fiber aggregate may change when the molded body is produced by causing the composite material to flow greatly during molding, the carbon fiber aggregate is preferably taken out from a part of the molded body that does not flow much in the molding. More specifically, in a case of cold pressing, since the surface of the molded body at a place where an upper mold comes into contact is a non-flow surface, the carbon fiber aggregate may be taken out directly under the non-flow surface of the molded body.

5. Coefficient of Variation of Reaction Force P

The coefficient of variation of the reaction force P in the present invention is preferably 20% or less, more preferably 15% or less, and even more preferably 10% or less. The coefficient of variation of the reaction force in the present invention is defined by:

cutting the composite material into samples at a pitch of approximately 100 mm×100 mm in the surface of the composite material; and calculating a coefficient of variation of each reaction force P with a formula (3). For example, a composite material of a width of 500 mm×a length of 500 mm is cut into 25 pieces in total of 5 in the width direction×5 in the length direction, and the pieces are measured to define the coefficient of variation.

Coefficient of variation of reaction force=100×standard deviation of reaction force/average value of reaction force     Formula (3)

In a case where the coefficient of variation of the reaction forces P is within the above range, the carbon fiber aggregate in the composite composition can uniformly press the thermoplastic resins when the carbon fiber is impregnated with the thermoplastic resin contained in the composite composition, and the carbon fiber aggregate is easy to penetrate into the thermoplastic resins (which means that the carbon fiber aggregate 103 presses the thermoplastic resins 102 in the directions 101 in FIG. 1). That is, when the coefficient of variation of the reaction forces P is 20% or less, there are few places where the reaction force P is partially large, and the carbon fibers and the thermoplastic resin can be prevented from excessively moving in the in-plane direction in the composite material due to the reaction force of the carbon fiber aggregate. Thus, nonuniformities in the areal weight of the composite material, the carbon fiber volume fraction, and the fiber orientation can be reduced. In addition, there are few places where the reaction force P is small in part, and a part where the carbon fiber aggregate does not sufficiently press the thermoplastic resin can be prevented, so that an unimpregnated part can also be reduced.

[Thermoplastic Matrix Resin]

The thermoplastic matrix resin used in the present invention is not particularly limited, and those having a desired softening point or melting point can be appropriately selected and used. Those having a softening point in a range of 180° C. to 350° C. are generally used as the thermoplastic matrix resin, but the present invention is not limited thereto.

In the present description, the thermoplastic matrix resin means a thermoplastic resin contained in the composite material. On the other hand, the thermoplastic resin means a general thermoplastic resin before the carbon fiber is impregnated.

[Areal Weight of Carbon Fiber Aggregate]

An areal weight of the carbon fiber aggregate is preferably 100 g/m² or more and less than 3000 g/m², and more preferably 500 g/m² or more and less than 2000 g/m².

[Measurement of Fiber Bundle]

With respect to the carbon fiber bundles, the "fiber bundle" is recognized as a fiber bundle that can be taken out with tweezer as will be described below. Regardless of a position pinched by the tweezers, the fiber bundles clung together as one bundle are taken out as the one bundle when taken out, so that the fiber bundle can be clearly defined. When the aggregate of the carbon fibers is observed to pick a fiber sample for analysis, it is possible to confirm where the plurality of fibers are bundled and how the fibers are deposited in the aggregate of carbon fibers by viewing the fiber sample from not only a direction of a longitudinal side thereof but also various directions and angles, and to determine which fiber bundles function as a bundle can be objectively and unmistakably. For example, when the fibers overlap each other, it can be determined that the fibers are two fiber bundles if the fibers are elements oriented to different directions of the fibers that are elements are not entangled with each other in an intersecting part.

With respect to the width and thickness of each carbon fiber bundle A1, when three straight lines (x axis, y axis, and z axis) orthogonal to each other are considered, a longitudinal direction of each carbon fiber bundle A1 is set to an x axis direction, the longer one among a maximum value $y_{max}$ of a length in a y axis direction orthogonal thereto and a maximum value z of a length in a z axis direction is taken as the width, and the shorter one is taken as the thickness. When $y_{max}$ and $z_{max}$ are equal, $y_{max}$ can be taken as the width, and z can be taken as the thickness.

An average value of the width of each carbon fiber bundle A1 determined by the above method is taken as an average width $W_{A1}$ of the carbon fiber bundles A1, and an average value of the thickness of each carbon fiber bundle A1 determined by the above method is taken as an average thickness $T_{A1}$ of the carbon fiber bundles A1.

[Method for Producing Composite Material]

The composite material in the present invention is preferably produced in a sheet shape from the composite composition containing the thermoplastic resin and the carbon fiber.

The "sheet shape" means a planar shape in which in a case where the smallest dimension is used as the thickness and the largest dimension is used as the length among three dimensions (for example, length, width, and thickness) that indicate the size of the fiber reinforced plastic, the length is 10 times or more with respect to the thickness.

In the present invention, the composite composition refers to a state before the carbon fibers are impregnated with the thermoplastic resin. The carbon fibers in the composite composition may be provided with a sizing agent (or binder), which is not the matrix resin and may be provided to the carbon fibers in the composite composition.

As a method for producing the composite composition, various methods can be used depending on forms of the thermoplastic resin and the carbon fiber. The method for producing the composite composition is not limited to a method to be described below.

[Impregnation with Thermoplastic Resin]

The composite material of the present invention is preferably produced by subjecting the composite composition containing carbon fibers and a thermoplastic resin to an impregnation by using a compression impregnation device.

1. Impregnation Device

In the impregnation of the composite composition, a compression impregnation device in which an interval (clearance) is adjusted can be used. The compression impregnation device may be any device for impregnation by sandwiching the composite composition and applying pressure, and is not particularly limited.

2. Narrowest Clearance of Compression Impregnation Device

In the method for producing the composite material of the present invention, a narrowest clearance in the compression impregnation device is preferably 0.9×Tm or more and 1.5×Tm or less with respect to a theoretical thickness Tm of the composite material. The narrowest clearance in the compression impregnation device means a setting value at a place where (or when) the clearance is minimum When the compression impregnation device is a pressing machine including an upper mold and a lower mold, the narrowest clearance is defined as a distance between the lower mold and the upper mold at the lowest position when the upper mold is lowered toward the lower mold.

Further, in order to maintain the clearance in the compression impregnation apparatus, it is preferable to add a pressure equal to or larger than the reaction force P of the carbon fiber aggregate to the carbon fiber aggregate by using a compression impregnation device.

The theoretical thickness Tm of the composite material is a thickness when it is assumed that there is no void in the composite material, and is derived by a value obtained by dividing the areal weight of the composite material by the density.

The void referred to herein does not include the void part of hollow fine additive such as hollow fine particles when the hollow additive is intentionally added.

[Volume Fraction of Carbon Fiber Contained in Composite Material]

In the present invention, there is no particular limit to a carbon fiber volume fraction (hereinafter may be referred to as "Vf" in the present description) contained in the composite material, which is defined by the following formula (2), but the carbon fiber volume fraction (Vf) is preferably 10 vol % to 60 vol %, more preferably 20 vol % to 50 vol %, and still more preferably 25 vol % to 45 vol %.

Carbon fiber volume fraction (Vf)=100×carbon fiber volume/(carbon fiber volume+thermoplastic matrix resin volume)    Formula (2)

When the carbon fiber volume fraction (Vf) in the composite material is 10 vol % or more, a desired mechanical characteristic is easily obtained. On the other hand, when the carbon fiber volume fraction (Vf) in the composite material does not exceed 60 vol %, fluidity when the composite material is used for press molding or the like is good, and a desired molded body shape is easily obtained.

The volume fraction (Vf) of the entire carbon fibers contained in the composite material (or molded body) is measured regardless of the type of the carbon fiber such as carbon fibers A and B.

[Relationship Between Composite Material and Molded Body]

In the present invention, the composite material is a material for producing the molded body, and the composite material becomes the molded body by press molding (also referred to as compression molding). Therefore, the composite material of the present invention has a plate shape, but the molded body is shaped into a three-dimensional shape.

[Molded Body]

The composite material of the present invention is preferably a composite material for producing the molded body by press molding. As the press molding, cold press molding is preferable.

[Press Molding]

As a preferable molding method at the time of producing the molded body by using the composite material, press molding is used, and a molding method such as hot press molding or cold press molding can be used.

In the present invention, press molding using cold pressing is particularly preferable. In a cold press method, for example, the composite material heated to a first predetermined temperature is thrown into a mold set to a second predetermined temperature, and then pressurization and cooling are performed.

Specifically, when the thermoplastic matrix resin constituting the composite material is crystalline, a first predetermined temperature is equal to or higher than a melting point, and a second predetermined temperature is lower than the melting point. When the thermoplastic matrix resin is amorphous, a first predetermined temperature is equal to or higher than a glass transition temperature, and a second predetermined temperature is lower than the glass transition temperature. That is, the cold pressing method includes at least the following steps A-1 to A-2.

Step A-1) A step of heating the composite material to the melting point or higher and a decomposition temperature or lower when the thermoplastic matrix resin is crystalline; or to the glass transition temperature or higher and the decomposition temperature or lower when the thermoplastic matrix resin is amorphous.

Step A-2) A step of disposing the composite material heated in the above step A-1) in a mold in which a temperature is adjusted to a temperature lower than a melting point when the thermoplastic matrix resin is crystalline; or to a temperature lower than a glass transition temperature when the thermoplastic matrix resin is amorphous, and pressing.

By performing these steps, molding of the composite material can be completed. The above steps need to be performed in the above order, but may include another step between the steps. Other steps include, for example, a forming step of preforming the composite material into a cavity shape of the mold by using a forming die different from the mold used in the step A-2) before the step A-2). The step A-2) is a step of obtaining the molded body having a desired shape by applying pressure to the composite material. A molding pressure at this time is not particularly limited, and is preferably less than 20 MPa, and more preferably 10 MPa or less with respect to a projection area of the mold cavity.

As a matter of course, various steps may be put between the above steps at the time of press molding. For example, vacuum compression molding may be used in which press molding is performed under vacuum.

EXAMPLES

Hereinafter, the invention will be described in detail with reference to examples, but the invention is not limited thereto.

1. Raw materials used in the following Examples are as follows.

PAN-based carbon fiber

Carbon fiber "TENAX" (registered trademark) UTS50-24K (average fiber diameter: 7 μm, fiber bundle width: 10 mm) manufactured by Teijin Limited Hereinafter, the carbon fiber may be abbreviated as "UTS 50".

Polyamide 6

Hereinafter, Polyamide 6 may be abbreviated as PA 6. A1030 manufactured by Unitika Ltd.

2. Values in the Examples were determined according to the following method.

(1) Method for measuring carbon fiber bundles (1-1) One sample of 100 mm×100 mm was cut off from the composite material. The sample was heated for one hour in an electric furnace (FP410 manufactured by Yamato Scientific Co., Ltd.) heated to 500° C. under a nitrogen atmosphere to burn off organic substances such as a matrix resin. A total of 1200 carbon fibers A each having a fiber length of 5 mm or more and 100 mm or less were extracted randomly with tweezers from the carbon fibers contained in the sample.

(1-2) With respect to all extracted carbon fiber bundles, the weight ($W_i$) of each carbon fiber bundle was measured by using a balance capable of measuring up to 1/100 mg, and the length was measured by using calipers.

Subsequently, based on the length of the carbon fiber bundle and a diameter Di and a density ($\rho_{cf}$) of the used carbon fiber, the number Ni of single fibers contained in each carbon fiber bundle was calculated. $Li/(Ni \times Di^2)$ of each carbon fiber bundle was determined, and based on the determined values, the carbon fiber bundles were divided into the carbon fiber bundles A1; and the carbon fibers A2 and the carbon fibers A3 other than the carbon fiber bundle A1, and $\Sigma W_{iA1}$, $\Sigma W_{iA2}$, and $\Sigma W_{iWA3}$ were measured respectively.

A volume fraction ($Vf_{A1}$) of the carbon fiber bundle A1 to the total amount of the carbon fiber A is determined by a formula (5) using the carbon fiber density ($\rho_{cf}$).

$$Vf_{A1} = \Sigma(W_{iA1}/\rho_{cf}) \times 100/((\Sigma W_{iA1}+W_{iA2}+W_{iA3})/\rho_{cf}) \quad \text{Formula (5)}$$

The same applies to volume fractions of the carbon fiber A2 and the carbon fiber A3.

In addition, $Lm/(Nm \times D_{A1}^2)$ was calculated from the weight average fiber length $L_{A1}$ of the carbon fiber bundles A1 extracted above and the number NA1 and the diameter $D_{A1}$ of the single fibers contained in each carbon fiber bundle.

(1-3) The number of measured carbon fiber bundles was determined from n values derived from the following formula (4) with an allowable error ε of 3%, a reliability μ (α) of 95%, and a population rate ρ of 0.5 (50%).

$$n = N/[(\varepsilon/\mu(\alpha))^2 \times \{(N-1)/\rho(1-\rho)\}+1] \quad \text{Formula (4)}$$

n: Necessary number of samples
μ(α): 1.96 when reliability is 95%
N: Size of base group
ε: Allowable error
ρ: Population rate Here, in a case where the composite material having a carbon fiber volume (Vf)=35% is cut into the sample of 100 mm×100 mm×thickness 2 mm and the sample is burned off, the size N of the base group is determined by (100 mm×100 mm×thickness 2 mm×Vf 35%)+((Di μm/2)²×π×fiber length×number of single fibers contained in fiber bundle). When the fiber diameter Di is 7 μm, the fiber length is 20 mm, and the number of single fibers contained in the fiber bundle is designed to be 1000, N≈9100.

When the value of N is substituted into the formula (4), the value of n is calculated to be about 960. In this Example, in order to improve the reliability, a slightly larger number of 1200 bundles were extracted and measured.

(2) Weight average fiber length $L_{A1}$ of carbon fiber bundles A1 contained in composite material The weight average fiber length $L_{A1}$ was calculated from the fiber length of the carbon fiber bundle measured in (1-2) based on the following formula.

Weight average fiber length=$(\Sigma Li^2)/(\Sigma Li)$   Formula (1)

(3) Areal Weight of Carbon Fiber Aggregate Taken Out

Five samples of 100 mm×100 mm were cut off from the composite material. The samples were heated for about one hour in an electric furnace heated to 500° C. under a nitrogen atmosphere, and organic substances such as a matrix resin were burnt off to obtain the carbon fiber aggregates. The weights of the carbon fiber aggregates were measured with a balance to determine the areal weight of each sample, and an average value of the five samples was calculated.

(4) Average thickness $T_{A1}$ and average width $W_{A1}$ of carbon fiber bundles A1

Thicknesses and widths of 1200 carbon fiber bundles A1 extracted in (1-2) were measured using calipers, and the average thickness $T_{A1}$ and the average width $W_{A1}$ of the carbon fiber bundles A1 were calculated.

(5) Volume fraction (Vf) of carbon fibers contained in composite material

One sample of 100 mm×100 mm was cut off from the composite material. The sample was heated for about one hour in an electric furnace heated to 500° C. under a nitrogen atmosphere, organic substances such as a matrix resin were burnt off, and weights of the sample before and after the treatment were weighed to calculate weights of the carbon fiber component and the thermoplastic matrix resin. Next, volume fractions of the carbon fibers and the thermoplastic matrix resin are calculated using specific gravity of each component.

Vf=100×carbon fiber volume/(carbon fiber volume+ thermoplastic matrix resin volume)   Formula (2)

(6) Reaction force P when carbon fiber aggregate is compressed to thickness Tf 25 samples of 100 mm×100 mm were cut off from the composite material, and then the samples were heated for about one hour in an electric furnace (FP410 manufactured by Yamato Scientific Co., Ltd.) heated to 500° C. under a nitrogen atmosphere, and organic substances such as a matrix resin were burnt off to obtain the carbon fiber aggregates. Next, weights of the samples were measured with a balance, an areal weight of each was calculated, and a thickness Tf defined in the following formula was calculated.

Tf: (areal weight of carbon fiber aggregate÷carbon fiber density)×3 (mm)

Next, each sample was compressed to Tf by a hand pressing machine with a load cell, a reaction forces Pi were calculated from a load value at that time, an average value of 25 reaction forces was set as the reaction force P, and coefficient of variation of 25 reaction forces were also calculated from the following formula.

Coefficient of variation of reaction forces=100×standard deviation of reaction forces/average value of reaction forces   Formula (3)

(7) Tensile Strength 25 test pieces were cut off from the composite material by using a water jet, and a tensile test was performed by using a 5982R4407 universal tester manufactured by Instron with reference to JIS K 7164 (2005). Shapes of the test pieces were A shapes. A distance between the chucks was 115 mm, and a test speed was 2 mm/min. The average value and the coefficient of variation were calculated from the following formula based on the measured values.

Coefficient of variation of tensile strength=100×standard deviation of tensile strengths/average value of tensile strengths   Formula (6)

(8) Number of Unimpregnated Fiber Bundles

One sample of 50 mm×50 mm was cut off from the composite material, and a cross section of one side thereof was polished with a sandpaper of #2000, and further buffed using a compound to produce a sample for measuring the number of unimpregnated fiber bundles. The sample was observed in the whole width of 50 mm at a magnification of 300 times by using an optical microscope, and the carbon fiber bundles not impregnated with the thermoplastic matrix resin were all extracted to obtain the number of unimpregnated fiber bundles.

Example 1

As the thermoplastic resin, nylon 6 resin A1030 (may be referred to as PA 6) manufactured by Unitika Ltd. was dispersed and fixed on a breathable support that is installed below a feeder and moves continuously in one direction by using the feeder such that an areal weight is set to be 740 g/m² to obtain a first layer of the thermoplastic resin aggregate.

Next, as the carbon fibers, long fibers consisting of carbon fibers "Tenax" (registered trademark) UTS 50-24K (average fiber diameter: 7 µm, number of single fibers: 24,000, strand thickness of carbon fibers: 180 µm (caliper measurement)) manufactured by Teijin Limited were widened to 28 mm by passing the long fibers through heating bars of 180° C.; then divided by using a rotary slit having a pitch of 1 mm; cut to a constant length by using a rotary cutter; and dispersed and fixed on the thermoplastic resin aggregate produced in advance on the breathable support that is installed directly below the rotary cutter, that moves continuously in the one direction, and that has a suction mechanism at a lower portion thereof to obtain the dispersed and fixed carbon fibers (also referred to as "carbon fiber dispersed body").

Further, PA 6 was dispersed and fixed on the carbon fiber dispersed body using the feeder such that the areal weight was 740 g/m² to form a second layer of the thermoplastic resin aggregate. Thus, a composite composition was obtained in which the thermoplastic resin/the carbon fiber dispersed body/the thermoplastic resin were laminated in this order.

The produced composite composition was heated at a pressure of 0.8 MPa for 6 minutes to 300° C. and held at 300° C. for 1 minute using a compression impregnation device in which the narrowest clearance is set to 1.0 time of the theoretical thickness Tm (2.0 mm) of the composite material such that the carbon fiber dispersed body was impregnated with the thermoplastic resin, and cooled to obtain the composite material. The compression impregnation device includes an upper mold and a lower mold, and a clearance when a distance between the upper mold and the lower mold is narrowest was set as a narrowest clearance.

When the carbon fiber aggregate was taken out from the composite material and examined, a proportion of the carbon fiber bundles A1 was 90 vol %, the weight average fiber length $L_{A1}$ was 20 mm, $L_{A1}/(N_{A1} \times D_{A1}^2)$ was 440, the average width $W_{A1}$ of the carbon fiber bundles A1 was 0.9 mm, the average thickness $T_{A1}$ of the carbon fiber bundles A1 was 50 μm, a proportion of the carbon fiber A2 was 10 vol %, a proportion of the carbon fiber A3 was 0 vol %, the areal weight was 1250 g/m², the reaction force P was 0.25 MPa when compressed to the thickness Tf, and a coefficient of variation of the reaction force P was 8%.

The carbon fiber volume fraction Vf of the obtained composite material was 35%, the tensile strength was 430 MPa, the coefficient of variation of the tensile strength was 4%, and the number of unimpregnated bundles present in a cross section having a width of 50 mm was 30.

The results are shown in Table 1.

Example 2

A composite material was produced in the same manner as in Example 1 except that a copolymer nylon VESTAMELT 250-P1 manufactured by Daicel-Evonik Ltd. was applied in a powder form as a fixing agent of carbon fiber bundle form of the carbon fibers A onto the carbon fibers after widening, melted and solidified, and that a pitch of the rotary slit was set to 0.5 mm. An adhesion amount of the fixing agent was 1.5 wt % with respect to the total amount of the carbon fibers A.

When the carbon fiber aggregate was taken out from the composite material and examined, a proportion of the carbon fiber bundle A1 was 95 vol %, the weight average fiber length $L_{A1}$ was 20 mm, $L_{A1}/(N_{A1} \times D_{A1}^2)$ was 800, the average width $W_{A1}$ of the carbon fiber bundles A1 was 0.5 mm, the average thickness $T_{A1}$ of the carbon fiber bundles A1 was 50 μm, a proportion of the carbon fiber A2 was 5 vol %, a proportion of the carbon fiber A3 was 0 vol %, the areal weight was 1270 g/m², the reaction force P was 0.10 MPa when the sample was compressed to the thickness Tf, and a coefficient of variation of the reaction force P was 7%.

When the obtained composite material was examined, the carbon fiber volume fraction Vf was 36%, the tensile strength was 420 MPa, the coefficient of variation of the tensile strength was 4%, and the number of unimpregnated bundles on a cross section having a width of 50 mm was 55. The results are shown in Table 1.

Example 3

A composite material was produced in the same manner as in Example 1 except that a tube was provided directly below the rotary cutter, and a step of blowing compressed air to the carbon fibers at a wind speed of 10 msec from a small hole of the tube was added.

When a carbon fiber aggregate was taken out from the composite material and examined, a proportion of the carbon fiber bundle A1 was 81 vol %, the weight average fiber length $L_{A1}$ was 20 mm, $L_{A1}/(N_{A1} \times D_{A1}^2)$ was 830, the average width $W_{A1}$ of the carbon fiber bundles A1 was 0.6 mm, the average thickness $T_{A1}$ of the carbon fiber bundles A1 was 40 μm, a proportion of the carbon fiber A2 was 19 vol %, a proportion of the carbon fiber A3 was 0 vol %, the areal weight was 1260 g/m², the reaction force P was 0.30 MPa when the sample was compressed to the thickness Tf, and a coefficient of variation of the reaction force P was 10%. When the obtained composite material was examined, the carbon fiber volume fraction Vf was 35%, the tensile strength was 450 MPa, the coefficient of variation of the tensile strength was 5%, and the number of unimpregnated bundles on a cross section having a width of 50 mm was 20. The results are shown in Table 1.

Example 4

A composite material was produced in the same manner as in Example 1 except that the breathable support did not have the suction mechanism at the lower portion thereof.

When the carbon fiber aggregate was taken out from the composite material and examined, a proportion of the carbon fiber bundle A1 was 90 vol %, the weight average fiber length $L_{A1}$ was 20 mm, $L_{A1}/(N_{A1} \times D_{A1}^2)$ was 330, the average width $W_{A1}$ of the carbon fiber bundles A1 was 1.0 mm, the average thickness $T_{A1}$ of the carbon fiber bundles A1 was 60 μm, a proportion of the carbon fiber A2 was 9 vol %, a proportion of the carbon fiber A3 was 1 vol %, the areal weight was 1230 g/m², the reaction force P was 0.30 MPa when the sample was compressed to the thickness Tf, and a coefficient of variation of the reaction force P was 12%. Since the suction mechanism was not provided, a proportion of the carbon fibers oriented in the plate thickness direction was larger than that in Example 3.

When the obtained composite material was examined, the carbon fiber volume fraction Vf was 34%, the tensile strength was 400 MPa, the coefficient of variation of the tensile strength was 5%, and the number of unimpregnated bundles on a cross section having a width of 50 mm was 35. The results are shown in Table 1.

Example 5

A composite material was produced in the same manner as in Example 3, except that the narrowest clearance of the compression impregnation device was set to 1.2 times the theoretical thickness Tm 2.0 mm of the composite material.

When a carbon fiber aggregate was taken out from the composite material and examined, a proportion of the carbon fiber bundle A1 was 81 vol %, the weight average fiber length $L_{A1}$ was 20 mm, $L_{A1}/(N_{A1} \times D_{A1}^2)$ was 830, the average width $W_{A1}$ of the carbon fiber bundles A1 was 0.6 mm, the average thickness $T_{A1}$ of the carbon fiber bundles A1 was 40 μm, a proportion of the carbon fiber A2 was 19 vol %, a proportion of the carbon fiber A3 was 0 vol %, the areal weight was 1270 g/m², the reaction force P was 0.30 MPa when the sample was compressed to the thickness Tf, and a coefficient of variation of the reaction force P was 10%.

When the obtained composite material was examined, the carbon fiber volume fraction Vf was 35%, the tensile strength was 430 MPa, the coefficient of variation of the tensile strength was 5%, and the number of unimpregnated bundles on a cross section having a width of 50 mm was 50. The results are shown in Table 1.

Example 6

A composite material was produced in the same manner as in Example 3, except that the narrowest clearance of the compression impregnation device was set to 0.95 time the theoretical thickness Tm 2.0 mm of the composite material.

When a carbon fiber aggregate was taken out from the composite material and examined, a proportion of the carbon fiber bundle A1 was 81 vol %, the weight average fiber length $L_{A1}$ was 20 mm, $L_{A1}/(N_{A1} \times D_{A1}^2)$ was 830, the average width $W_{A1}$ of the carbon fiber bundles A1 was 0.6 mm, the average thickness $T_{A1}$ of the carbon fiber bundles A1 was 40 µm, a proportion of the carbon fiber A2 was 19 vol %, a proportion of the carbon fiber A3 was 0 vol %, the areal weight was 1250 g/m², the reaction force P was 0.30 MPa when the sample was compressed to the thickness Tf, and a coefficient of variation of the reaction force P was 10%.

When the obtained composite material was examined, the carbon fiber volume fraction Vf was 35%, the tensile strength was 460 MPa, the coefficient of variation of the tensile strength was 4%, and the number of unimpregnated bundles on a cross section having a width of 50 mm was 10. The results are shown in Table 1.

Comparative Example 1

A composite material was produced in the same manner as in Example 3 except that a wind speed of compressed air blown from a small hole in the tube provided directly below the rotary cutter was 100 m/sec.

When a carbon fiber aggregate was taken out from the composite material and examined, a proportion of the carbon fiber bundle A1 was 60 vol %, the weight average fiber length $L_{A1}$ was 20 mm, $L_{A1}/(N_{A1} \times D_{A1}^2)$ was 1300, the average width $W_{A1}$ of the carbon fiber bundles A1 was 0.4 mm, the average thickness $T_{A1}$ of the carbon fiber bundles A1 was 40 µm, a proportion of the carbon fiber A2 was 40 vol %, a proportion of the carbon fiber A3 was 0 vol %, the areal weight was 1240 g/m², the reaction force P was 1.10 MPa when the sample was compressed to the thickness Tf, and a coefficient of variation of the reaction force P was 12%. Since the wind speed of compressed air was increased, the proportion of the carbon fiber A2 increases, and since denseness of the carbon fiber increases, as a result, the reaction force P was more than 1.00 MPa.

When the obtained composite material was examined, the carbon fiber volume fraction Vf was 36%, the tensile strength was 350 MPa, the coefficient of variation of the tensile strength was 8%, and the number of unimpregnated bundles on a cross section having a width of 50 mm was 120. The results are shown in Table 2.

Comparative Example 2

A composite material was produced in the same manner as in Example 1 except that a pitch of the rotary slit was 2.0 mm.

When a carbon fiber aggregate was taken out from the composite material and examined, a proportion of the carbon fiber bundle A1 was 91 vol %, the weight average fiber length $L_{A1}$ was 20 mm, $L_{A1}/(N_{A1} \times D_{A1}^2)$ was 150, the average width $W_{A1}$ of the carbon fiber bundles A1 was 1.5 mm, the average thickness $T_{A1}$ of the carbon fiber bundles A1 was 90 µm, a proportion of the carbon fiber A2 was 1 vol %, a proportion of the carbon fiber A3 was 8 vol %, the areal weight was 1240 g/m², the reaction force P was 0.03 MPa when the sample was compressed to the thickness Tf, and a coefficient of variation of the reaction force P was 25%. Since a slit width widens, the proportion of the carbon fibers A3 increases, and the number of carbon fiber bundles relatively decreases, so that a target reaction force could not be obtained.

When the obtained composite material was examined, the carbon fiber volume fraction Vf was 36%, the tensile strength was 320 MPa, the coefficient of variation of the tensile strength was 10%, and the number of unimpregnated bundles on a cross section having a width of 50 mm was 160. The results are shown in Table 2.

Comparative Example 3

A composite material was produced in the same manner as in Example 2 except that an adhesion amount of the carbon fiber bundle form fixing agent was 3.0 wt % with respect to the total amount of the carbon fiber A and a pitch of the rotary slit was 1.5 mm.

When a carbon fiber aggregate was taken out from the composite material and examined, a proportion of the carbon fiber bundle A1 was 100 vol %, the weight average fiber length $L_{A1}$ was 20 mm, $L_{A1}/(N_{A1} \times D_{A1}^2)$ was 220, the average width $W_{A1}$ of the carbon fiber bundles A1 was 1.5 mm, the average thickness $T_{A1}$ of the carbon fiber bundles A1 was 60 µm, a proportion of the carbon fiber A2 was 0 vol %, a proportion of the carbon fiber A3 was 0 vol %, the areal weight was 1270 g/m², the reaction force P was 0.03 MPa when the sample was compressed to the thickness Tf, and a coefficient of variation of the reaction force P was 12%.

When the obtained composite material was examined, the carbon fiber volume fraction Vf was 34%, the tensile strength was 330 MPa, the coefficient of variation of the tensile strength was 7%, and the number of unimpregnated bundles on a cross section having a width of 50 mm was 150. The results are shown in Table 2.

Comparative Example 4

A composite material was produced in the same manner as in Example 3 except that a wind speed of compressed air blown from a small hole in the tube having a widened width of 20 mm and provided directly below the rotary cutter was 40 m/sec.

When the carbon fiber aggregate was taken out from the composite material and examined, a proportion of the carbon fiber bundle A1 was 90 vol %, the weight average fiber length $L_{A1}$ was 20 mm, $L_{A1}/(N_{A1} \times D_{A1}^2)$ was 420, the average of the carbon fiber bundles A1 width $W_{A1}$ was 0.8 mm, the average thickness $T_{A1}$ of the carbon fiber bundles A1 was 60 µm, a proportion of the carbon fiber A2 was 9 vol %, a proportion of the carbon fiber A3 was 1 vol %, the areal weight was 1240 g/m², the reaction force P was 0.04 MPa when the sample was compressed to the thickness Tf, and a coefficient of variation of the reaction force P was 17%.

When the obtained composite material was examined, the carbon fiber volume fraction Vf was 35%, the tensile strength was 350 MPa, the coefficient of variation of the tensile strength was 9%, and the number of unimpregnated bundles on a cross section having a width of 50 mm was 130. The results are shown in Table 2.

TABLE 1

| | | | Example 1 | Example 2 | Example 3 | Example 4 | Example 5 | Example 6 |
|---|---|---|---|---|---|---|---|---|
| Carbon fiber A | Type | | UTS50 | UTS50 | UTS50 | UTS50 | UTS50 | UTS50 |
| | Density | (g/cm³) | 1.79 | 1.79 | 1.79 | 1.79 | 1.79 | 1.79 |
| | Form fixing agent | | None | Present | None | None | None | None |
| Carbon fiber bundle A1 | Proportion of carbon fiber bundle A1 to carbon fiber A | (vol %) | 90 | 95 | 81 | 90 | 81 | 81 |
| | $L_{A1}$: weight average fiber length of carbon fiber bundle A1 | (mm) | 20 | 20 | 20 | 20 | 20 | 20 |

TABLE 1-continued

|  |  |  | Example 1 | Example 2 | Example 3 | Example 4 | Example 5 | Example 6 |
|---|---|---|---|---|---|---|---|---|
|  | $N_{A1}$: average number of single fibers in carbon fiber bundle A1 | (pieces) | 918 | 510 | 490 | 1224 | 490 | 490 |
|  | $D_{A1}$: diameter of single carbon fiber constituting carbon fiber bundle A1 | (mm) | 0.007 | 0.007 | 0.007 | 0.007 | 0.007 | 0.007 |
|  | $L_{A1}/(N_{A1} \times D_{A1}^2)$ |  | 440 | 800 | 830 | 330 | 830 | 830 |
|  | $W_{A1}$: Average width of carbon fiber bundles A1 | (mm) | 0.9 | 0.5 | 0.6 | 1.0 | 0.6 | 0.6 |
|  | $T_{A1}$: Average thickness of carbon fiber bundles A1 | (μm) | 50 | 50 | 40 | 60 | 40 | 40 |
| Carbon fiber A2 | Proportion of carbon fiber bundle A2 to carbon fiber A | (vol %) | 10 | 5 | 19 | 9 | 19 | 19 |
| Carbon fiber A3 | Proportion of carbon fiber bundle A3 to carbon fiber A | (vol %) | 0 | 0 | 0 | 1 | 0 | 0 |
| Thermoplastic resin | Type |  | PA 6 | PA 6 | PA 6 | PA 6 | PA 6 | PA 6 |
|  | Density | (g/cm³) | 1.14 | 1.14 | 1.14 | 1.14 | 1.14 | 1.14 |
| Narrowest clearance in compression impregnation device to theoretical thickness Tm of composite material |  | (times) | 1.0 | 1.0 | 1.0 | 1.0 | 1.2 | 0.95 |
| Composite material | Theoretical thickness | (mm) | 2.0 | 2.0 | 2.0 | 2.0 | 2.0 | 2.0 |
|  | Carbon fiber volume fraction Vf | (%) | 35 | 36 | 35 | 34 | 35 | 35 |
|  | Carbon fiber weight fraction Wf | (%) | 46 | 47 | 46 | 45 | 46 | 46 |
|  | Density | (g/cm³) | 1.37 | 1.37 | 1.37 | 1.36 | 1.37 | 1.37 |
|  | Number of unimpregnated fiber bundles | (bundles/50 mm width) | 30 | 55 | 20 | 35 | 50 | 10 |
|  | Tensile strength | (MPa) | 430 | 420 | 450 | 400 | 430 | 460 |
|  | Coefficient of variation of tensile strength | (%) | 4 | 4 | 5 | 5 | 5 | 4 |
| Carbon fiber aggregate taken out by removing matrix resin | Areal weight | (g/m²) | 1250 | 1270 | 1260 | 1230 | 1270 | 1250 |
|  | Tf: (areal weight of carbon fiber aggregate ÷ carbon fiber density) × 3 | (mm) | 2.1 | 2.1 | 2.1 | 2.1 | 2.1 | 2.1 |
|  | Reaction force P when compressed to thickness Tf | (MPa) | 0.25 | 0.10 | 0.30 | 0.30 | 0.30 | 0.30 |
|  | Coefficient of variation of reaction force P | (%) | 8 | 7 | 10 | 12 | 10 | 10 |

TABLE 2

|  |  |  | Comparative Example 1 | Comparative Example 2 | Comparative Example 3 | Comparative Example 4 |
|---|---|---|---|---|---|---|
| Carbon fiber A | Type |  | UTS50 | UTS50 | UTS50 | UTS50 |
|  | Density | (g/cm³) | 1.79 | 1.79 | 1.79 | 1.79 |
|  | Form fixing agent |  | None | None | Present | None |
| Carbon fiber bundle A1 | Proportion of carbon fiber bundle A1 to carbon fiber A | (vol %) | 60 | 91 | 100 | 90 |
|  | $L_{A1}$: weight average fiber length of carbon fiber bundle A1 | (mm) | 20 | 20 | 20 | 20 |
|  | $N_{A1}$: average number of single fibers in carbon fiber bundle A1 | (pieces) | 327 | 2755 | 1837 | 980 |
|  | $D_{A1}$: diameter of single carbon fiber constituting carbon fiber bundle A1 | (mm) | 0.007 | 0.007 | 0.007 | 0.007 |
|  | $L_{A1}/(N_{A1} \times D_{A1}^2)$ |  | 1300 | 150 | 220 | 420 |
|  | $W_{A1}$: Average width of carbon fiber bundles A1 | (mm) | 0.4 | 1.5 | 1.5 | 0.8 |
|  | $T_{A1}$: Average thickness of carbon fiber bundles A1 | (μm) | 40 | 90 | 60 | 60 |
| Carbon fiber A2 | Proportion of carbon fiber bundle A2 to carbon fiber A | (vol %) | 40 | 1 | 0 | 9 |
| Carbon fiber A3 | Proportion of carbon fiber bundle A3 to carbon fiber A | (vol %) | 0 | 8 | 0 | 1 |
| Thermoplastic resin | Type |  | PA 6 | PA 6 | PA 6 | PA 6 |
|  | Density | (g/cm³) | 1.14 | 1.14 | 1.14 | 1.14 |
| Narrowest clearance in compression impregnation device to theoretical thickness Tm of composite material |  | (times) | 1.0 | 1.0 | 1.0 | 1.0 |
| Composite material | Theoretical thickness | (mm) | 2.0 | 2.0 | 2.0 | 2.0 |
|  | Carbon fiber volume fraction Vf | (%) | 36 | 36 | 34 | 35 |
|  | Carbon fiber weight fraction Wf | (%) | 47 | 47 | 45 | 46 |
|  | Density | (g/cm³) | 1.37 | 137 | 1.36 | 1.37 |
|  | Number of unimpregnated fiber bundles | (bundles/50 | 120 | 160 | 150 | 130 |
|  | Tensile strength | (MPa) | 350 | 320 | 330 | 350 |
|  | Coefficient of variation of tensile strength | (%) | 8 | 10 | 7 | 9 |
| Carbon fiber aggregate taken out by removing matrix resin | Areal weight | (g/m²) | 1240 | 1240 | 1270 | 1240 |
|  | Tf: (areal weight of carbon fiber aggregate ÷ carbon fiber density) × 3 | (mm) | 2.1 | 2.1 | 2.1 | 2.1 |
|  | Reaction force P when compressed to thickness Tf | (MPa) | 1.10 | 0.03 | 0.03 | 0.04 |
|  | Coefficient of variation of reaction force P | (%) | 12 | 25 | 12 | 17 |

INDUSTRIAL APPLICABILITY

The composite material of the present invention and the molded body obtained by molding the composite material can be used in manufacture of various constructional members, for example, structural members of automobiles; and all parts where impact absorption is desired such as a frame or housing of various electrical products or a machine, particularly preferably a press molded body that can be used as an automobile part.

Although the invention has been described in detail with reference to specific embodiments, it will be apparent to those skilled in the art that various changes and modifications can be made without departing from the spirit and scope of this disclosure.

This application is based on Japanese Patent Application 2017-229666 filed on Nov. 29, 2017 and Japanese Patent Application 2018-149791 filed on Aug. 8, 2018, contents of which are incorporated by reference herein.

REFERENCE SIGN LIST

101 Reaction force P
102 Thermoplastic resin
103 Carbon fiber aggregate
104 Lower side of compression impregnation device

The invention claimed is:

1. A composite material comprising:
carbon fibers A comprising:
   carbon fiber bundles A1 in which $Li/(Ni \times Di^2)$ is $6.7 \times 10^1$ or more and $3.3 \times 10^3$ or less,
   carbon fiber bundles A2 in which $Li/(Ni \times Di^2)$ is more than $3.3 \times 10^3$, and
   carbon fiber bundles A3 in which $Li/(Ni \times Di^2)$ is more than $6.7 \times 10^1$; and
a thermoplastic matrix resin, wherein
the carbon fibers A have fiber lengths of 5 mm or more and 100 mm or less,
the carbon fibers A contains 80 vol % or more and less than 100 vol % of the carbon fiber bundles A1, where the carbon fiber bundles A1 have an average thickness $T_{A1}$ of less than 60 μm, and more than 0 vol % and less than 20 vol % of carbon fibers A2, and 5 vol % or less of carbon fibers A3,
where an aggregate of the carbon fibers taken out from the composite material from which the matrix resin is removed has a reaction force P of 0.05 MPa or more and 1.00 MPa or less when the aggregate is compressed to a thickness Tf,
wherein,
Li represents fiber length of carbon fiber bundle (mm),
Di represents diameter of single carbon fibers constituting carbon fiber bundle (mm),
Ni represents number of single fibers contained in carbon fiber bundle, and
Tf represents (areal weight of carbon fiber aggregate÷carbon fiber density)×3 (mm).

2. The composite material according to claim 1, wherein the reaction force P has a coefficient of variation of 20% or less.

3. The composite material according to claim 1, wherein $L_{A1}/(N_{A1} \times D_{A1}^2)$ is $1.0 \times 10^2$ or more and $3.3 \times 10^3$ or less, wherein
$L_{A1}$ represents weight average fiber length (mm) of carbon fiber bundle A1 (mm),
$N_{A1}$ represents average number of single fibers contained in carbon fiber bundle A1, and
$D_{A1}$ represents diameter (mm) of single carbon fibers constituting carbon fiber bundle A1.

4. The composite material according to claim 1, wherein the aggregate of the carbon fibers taken out from the composite material has an areal weight of 100 g/m² or more and less than 3000 g/m².

5. The composite material according to claim 1, wherein the carbon fiber bundles A1 have an average width $W_{A1}$ of 0.1 mm or more and 2.0 mm or less, and an average thickness $T_{A1}$ of 20 μm or more and 95 μm or less.

6. The composite material according to claim 1, wherein the reaction force P has a coefficient of variation of 15% or less.

7. The composite material according to claim 1, wherein the reaction force P has a coefficient of variation of 10% or less.

8. The composite material according to claim 1, wherein a number of unimpregnated carbon fiber bundles A1 present in a cross section having a width of 50 mm is 10 to 55.

9. A composite material comprising:
carbon fibers A comprising carbon fiber bundles A1 in which $Li/(Ni \times Di^2)$ is $6.7 \times 10^1$ or more and $3.3 \times 10^3$ or less, wherein the carbon fiber bundles A1 have an average width $W_{A1}$ of 0.1 mm or more and 2.0 mm or less and an average thickness TAl of 20 μm or more and 95 μm or less and carbon fibers A3 in which $Li/(Ni \times Di^2)$ is less than $6.7 \times 10^1$; and
a thermoplastic matrix resin; wherein
the carbon fibers A have fiber lengths of 5 mm or more and 100 mm or less,
the carbon fibers A contains 80 vol % or more and less than 100 vol % of the carbon fiber bundles A1 and 5 vol % or less of carbon fibers A3, and
where an aggregate of the carbon fibers taken out from the composite material from which the matrix resin is removed has a reaction force P of 0.05 MPa or more and 1.00 MPa or less when the aggregate is compressed to a thickness Tf,
wherein,
Li represents fiber length of carbon fiber bundle (mm),
Di represents diameter of single carbon fibers constituting carbon fiber bundle (mm),
Ni represents number of single fibers contained in carbon fiber bundle, and
Tf represents (areal weight of carbon fiber aggregate÷carbon fiber density)×3 (mm).

10. The composite material according to claim 9, wherein the reaction force P has a coefficient of variation of 15% or less.

11. The composite material according to claim 9, wherein the reaction force P has a coefficient of variation of 10% or less.

12. The composite material according to claim 9, wherein a number of unimpregnated carbon fiber bundles A1 present in a cross section having a width of 50 mm is 10 to 55.

13. A method for producing a composite material comprising:
performing impregnation of a composite composition containing carbon fibers A having fiber lengths of 5 mm or more and 100 mm or less and a thermoplastic resin by using a compression impregnation device, wherein the carbon fibers A contain 80 vol % or more and less than 100 vol % of carbon fiber bundles A1, where the carbon fiber bundles A1 have an average thickness TAl of less than 60 μm, and more than 0 vol % and less than 20 vol % of carbon fibers A2, and 5 vol % or less of carbon fibers A3, carbon fiber bundles A1 in which $Li/(Ni \times Di^2)$ is $6.7 \times 10^1$ or more and $3.3 \times 10^3$ or less, carbon fiber bundles A2 in which $Li/(Ni \times Di^2)$ is more than $3.3 \times 10^3$, and carbon fiber bundles A3 in which $Li/(Ni \times Di^2)$ is more than $6.7 \times 10^1$; and an aggregate of the carbon fibers taken out from the composite material from which the matrix resin is removed has a reaction force P of 0.05 MPa or more and 1.00 MPa or less when the aggregate is compressed to a thickness Tf, wherein, Li represents fiber length of carbon fiber bundle (mm), Di represents diameter of single carbon fibers constituting carbon fiber bundle (mm)

Ni represents number of single fibers contained in carbon fiber bundle

Tf: (areal weight of carbon fiber aggregate=carbon fiber density)×3 (mm).

14. The method for producing a composite material according to claim 13, wherein the compression impregnation device has a narrowest clearance of 0.9×Tm or more and 1.5×Tm or less, wherein Tm represents a theoretical thickness of the composite material.

\* \* \* \* \*